(12) United States Patent
Heintzelman et al.

(10) Patent No.: US 10,976,588 B2
(45) Date of Patent: Apr. 13, 2021

(54) CONCEALED DISPLAYS

(71) Applicant: Gentex Corporation, Zeeland, MI (US)

(72) Inventors: Adam R. Heintzelman, Grand Rapids, MI (US); Xiaoxu Niu, Grand Rapids, MI (US); Andrew D. Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/718,913

(22) Filed: Dec. 18, 2019

(65) Prior Publication Data
US 2020/0192146 A1   Jun. 18, 2020

Related U.S. Application Data

(60) Provisional application No. 62/781,022, filed on Dec. 18, 2018.

(51) Int. Cl.
*G02F 1/1335* (2006.01)
*G02F 1/1333* (2006.01)

(52) U.S. Cl.
CPC .. *G02F 1/133509* (2013.01); *G02F 1/133504* (2013.01); *G02F 1/133528* (2013.01); *G02F 1/133536* (2013.01); *G02F 2001/133331* (2013.01); *G02F 2001/133541* (2013.01); *G02F 2001/133562* (2013.01); *G02F 2001/133567* (2013.01)

(58) Field of Classification Search
CPC ........................................... G02F 2001/133331
See application file for complete search history.

(56) References Cited

U.S. PATENT DOCUMENTS

| | | | |
|---|---|---|---|
| 2004/0223094 A1* | 11/2004 | Hamada | G02F 1/133615 349/63 |
| 2016/0026039 A1* | 1/2016 | Sakai | G02F 1/133555 345/1.3 |
| 2017/0176787 A1 | 6/2017 | Jia et al. | |
| 2017/0322357 A1 | 11/2017 | de Jong et al. | |
| 2020/0012150 A1* | 1/2020 | Watanabe | G02F 1/133555 |

FOREIGN PATENT DOCUMENTS

KR     0101468212 B1    3/2014

\* cited by examiner

*Primary Examiner* — Alexander P Gross
(74) *Attorney, Agent, or Firm* — Price Heneveld LLP; Bradley D. Johnson (57) ABSTRACT

An electronic device includes a cover substrate defining a first surface and a second surface. A polarizer is coupled to the second surface of the cover substrate and an electro-optic element. A light source is coupled to the electro-optic element. A concealment layer extends proximate a perimeter of the electro-optic element. The concealment layer is positioned between the polarizer and the electro-optic element.

15 Claims, 4 Drawing Sheets

CONCEALED DISPLAYS

CROSS-REFERENCE TO RELATED APPLICATION

This application claims priority under 35 U.S.C. § 119(e) and the benefit of U.S. Provisional Application No. 62/781,022 entitled CONCEALED DISPLAYS, filed on Dec. 18, 2018, the disclosure of which is hereby incorporated herein by reference in its entirety.

FIELD OF THE DISCLOSURE

The present disclosure generally relates to displays, and more particularly to arrangements and configurations for the concealment of displays utilizing mask layers.

BACKGROUND

Conventional electro-optic displays are constructed with a mask layer disposed over a polarizing layer on the electro-optic display. Such an arrangement may lead effectively hide non-aesthetically pleasing construction of the display, but often leads to high contrast between the display and the mask layer due to a discontinuity in the visibility of the polarizing layer. The high contrast between the mask layer and the display may be readily seen by a viewer while the display is in an off state.

SUMMARY OF THE DISCLOSURE

According to at least one feature of the present disclosure, an electronic device includes a cover substrate defining a first surface and a second surface and an electro-optic element defining a third surface and fourth surface, wherein the third surface is adjacent the second surface. A polarizer is disposed between the second surface of the cover substrate and the third surface of the electro-optic element. A light source is coupled to the fourth surface of the electro-optic element. A concealment layer extends proximate a perimeter of the electro-optic element. The concealment layer is positioned between the polarizer and the third surface of the electro-optic element.

According to at least one feature of the present disclosure, an electronic device includes a cover substrate defining a first surface and a second surface and a liquid crystal element defining a third surface and a fourth surface and disposed proximate to the second surface of the cover substrate. A first polarizer is disposed between to the second surface of the cover substrate and the third surface of the liquid crystal element. A diffuser positioned between the first polarizer and the third surface of the liquid crystal element is coupled with a liquid crystal element. A concealment layer is positioned between the first polarizer and the diffuser proximate a periphery of the cover substrate. A second polarizer is coupled to the fourth surface of the liquid crystal element. A light source is coupled to the second polarizer.

According to at least one feature of the present disclosure, an electronic device includes cover substrate defining a first surface and a second surface and an electro-optic element defining a third surface and fourth surface, wherein the third surface is proximate the second surface. A polarizer is coupled to the second surface of the cover substrate. A concealment layer is positioned between the polarizer and the third surface of the electro-optic element to define a viewing area and a framed area. The electronic device exhibits an average difference in eye-weighted reflectance between the framed area and the viewing area of about 0.8 or less over a wavelength range of form about 400 nm to about 700 nm.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
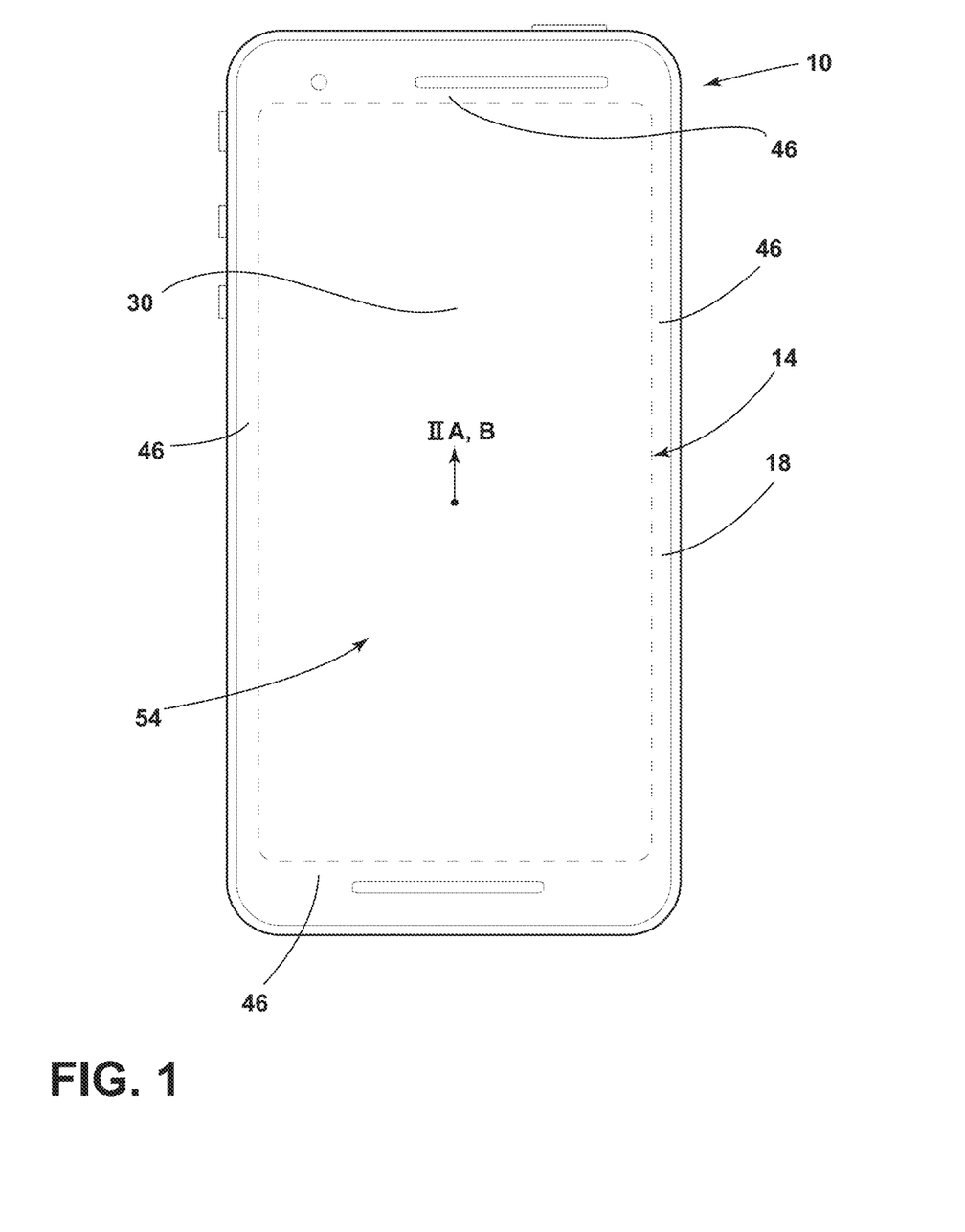
FIG. 1 is a plan view of an electronic device, according to at least one example.
Figure 2A:
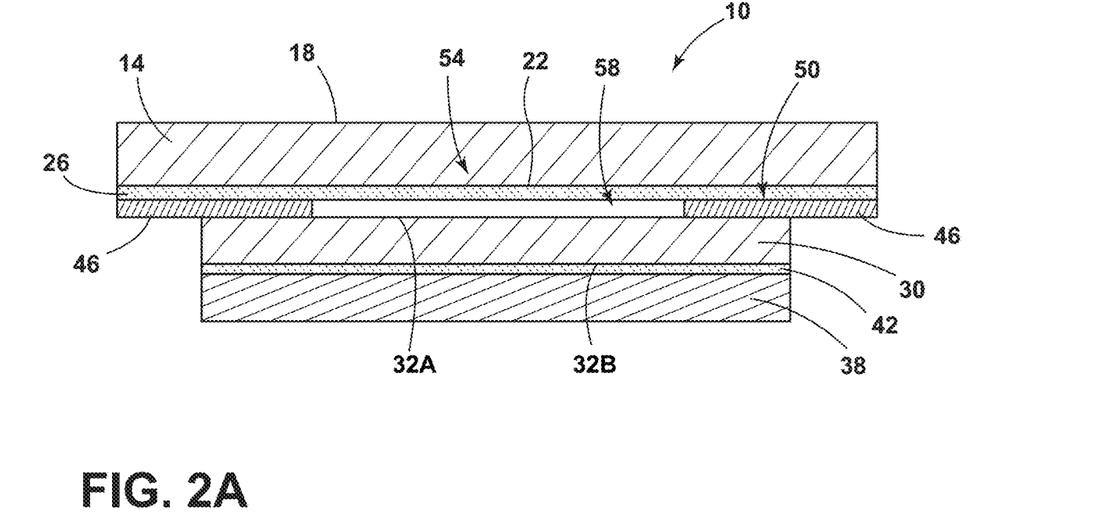
FIG. 2A is a cross-sectional view taken at line IIA of FIG. 1 according to at least one example.
Figure 2B:
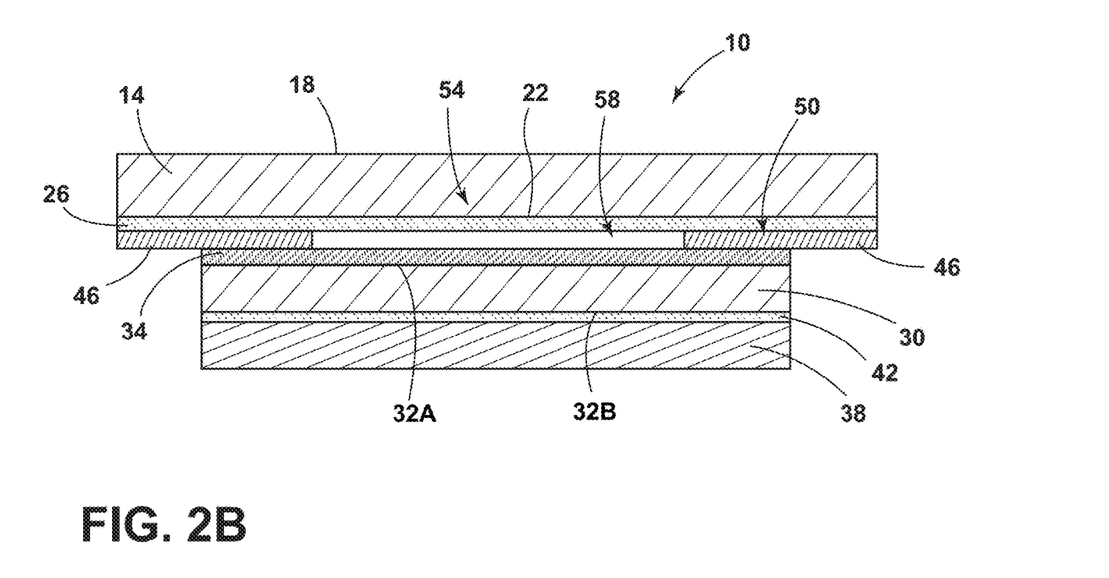
FIG. 2B is a cross-sectional view taken at line IIB of FIG. 1 according to at least one example.

Referring now to FIGS. 1-2B, reference numeral 10 generally designates an electronic device. The electronic device 10 may include one or more of a cover substrate 14 defining a first surface 18 and a second surface 22, an electro-optic element 30 defining a third surface 32A and fourth surface 32B, wherein the third surface 32A is adjacent the second surface 22, a first polarizer 26 disposed between the second surface 22 of the cover substrate 14 and the third surface 32A of the electro-optic element 30, a diffuser 34 coupled to the electro-optic element 30, a light source 38 coupled to the electro-optic element 30; a second polarizer 42 and a concealment layer 46 extending around a perimeter of the electro-optic element 30. According to various examples, the concealment layer 46 is positioned between the first polarizer 26 and the third surface 32A of the electro-optic element 30. Positioning of the concealment layer 46 around the perimeter of the electro-optic element 30 creates a framed area 50 which defines a viewing area 54 through which the electro-optic element 30 is visible through the cover substrate 14. According to various examples, a gap 58 may be present within the electronic device 10.

Referring now to FIGS. 1 and 2A, although depicted as a mobile electronic device (e.g., a cellular telephone), the disclosure related to the electronic device 10 may equally be applied to displays (e.g. LCD, OLED, micro-LED, OLCD, etc.), screens, computer monitors, televisions, rearview mirrors, heads-up displays, scanning apparatuses and other applications without departing from the teachings provided herein. The device 10 may be utilized in automotive, nautical, aerospace, architectural and/or other applications where a stealthy electronic device may be beneficial. In some examples, the electronic device 10 may be incorporated in various portions of a vehicle, which may include internal and external portions (e.g. a pillar, cabin, infotainment center, door, door sill, trunk, spoiler, hood, roof, etc.). For example, the electronic device 10 may be incorporated in a B-pillar of the vehicle. As will be explained in greater detail below, use of the disclosed arrangement of the components of the electronic device 10 may be advantageous in decreasing an apparent difference in reflection and color between the concealment layer 46 and the viewing area 54 as compared to conventional designs. As such, the electronic device 10 may include a monolithic appearance when the display is not active. Further, it will be understood that the teachings of the present disclosure may equally apply to non-electronic devices such as viewing panes, windows and the like.

The cover substrate 14 is positioned proximate a viewer side, or front, of the electronic device 10. The cover substrate 14 may have a thickness (e.g., as measured from the minimum or maximum distance between first surface 18 to the second surface 22) of from about 0.1 mm to about 3.5 mm or any and all values and ranges therebetween. For example, the thickness of the cover substrate 14 may be about 3.5 mm or less, about 3.0 mm or less, about 2.5 mm or less, about 2.2 mm or less, about 2.0 mm or less, about 1.5 mm or less, about 1.2 mm or less, or about 1.0 mm or less or any and all values and ranges therebetween. Further, the thickness of the cover substrate 14 may vary with position. The cover substrate 14 may take a variety of shapes including square, rectangular, circular, oblong, triangular, higher order polygons and combinations thereof. The cover substrate 14 may have a length and/or width dimension of about 10 mm or greater, about 20 mm or greater, about 50 mm or greater, about 75 mm or greater, about 85 mm or greater, about 100 mm or greater, about 150 mm or greater, about 175 mm or greater, about 200 mm or greater, about 250 mm or greater, about 300 mm or greater or about 500 mm or greater. According to various examples, the cover substrate 14 may have a curvature across a portion of the length or width (i.e., a vertical or horizontal axis) of the cover substrate 14. For example, the cover substrate 14 may have a radius of curvature of about 2000 mm or less, about 1500 mm or less, about 1300 mm or less, about 1250 mm or less, about 1200 mm or less, about 1100 mm or less, about 1000 mm or less, about 900 mm or less, about 800 mm or less, about 700 mm or less, about 600 mm or less, about 500 mm or less, about 400 mm or less, about 300 mm or less, about 200 mm or less or about 100 mm or less. For purposes of this disclosure, the radius of curvature of a curved surface (e.g., the first surface 18) equals the radius of the circular arc which best approximates the curve of that surface where the curve remains constant and/or the length of that surface.

The cover substrate 14 may include a variety of materials transparent in the visible region of the electromagnetic spectrum including soda-lime float glass, alkaline earth boro-aluminosilicate glass, alkali-aluminosilicate glass, borosilicate glass, chemically strengthened glass, heat-strengthened glass, insulated glass, tempered glass, sapphire, optical crystals, diamond, quartz, ceramics, a polymeric material, a mixture of polymers and/or plastics and/or combinations thereof. In polymeric examples, the cover substrate 14 may include a polymeric material composed of one or more of cycloolefin, polyethylene terephthalate, polyethylene naphthalate, polyimide, high density polyethylene, polysulfone, acrylic, polycarbonate, acrylonitrile butadiene styrene, polychlorotrifluoroethylene, polyphenylene sulfide, poly(methyl methacrylate), polyvinyl alcohol, ethylene vinyl alcohol, moisture-resistant polymers, gas resistant polymers and/or combinations thereof. It will be understood that in various examples, the cover substrate 14 may be transparent, translucent and/or opaque. For example, the cover substrate 14 may be substantially transparent, or configured to allow about 50% or greater of visible light incident on the substrate 14 to be transmitted.

The first polarizer 26 is coupled to the second surface 22 of the cover substrate 14. The first polarizer 26 may be laminated or optically coupled (e.g., through an optical coupling adhesive) to the second surface 22 of the cover substrate 14. In yet other examples, a separate substrate may be employed to support the first polarizer 26. Regardless, the first polarizer 26 may extend across a portion, a majority, substantially all or all of the second surface 22 of the cover substrate 14. For example, the first polarizer 26 may extend across the viewing area 54 in addition to the framed area 50 defined by the concealment layer 46. According to various examples, the first polarizer 26 may substantially extend to an edge of the cover substrate 14 such that the first polarizer 26 is continuous. As will be explained in greater detail below, by positioning the first polarizer 26 between a viewer of the electronic device 10 and both the viewing area 54 and the framed area 50 defined by the concealment layer 46, a difference in optical properties (e.g., reflectance, color, etc.) between the framed area 50 of the concealment layer 46 and the electro-optic element 30 in the viewing area 54 may be decreased while the electro-optic element 30 is in an power off of shut down condition.

According to various examples, the first polarizer 26 is an absorbing polarizer. For purposes of this disclosure, an absorbing polarizer is a structure configured to transmit a first polarization of light (e.g., vertical, 45°, horizontal and/or any orientation therebetween) and absorb a second polarization of light (e.g., vertical, 45°, horizontal and/or any orientation therebetween). According to various examples, the first polarizer 26 is configured to transmit a first polarization of light (e.g., vertical) and absorb the second polarization of light (e.g., horizontal) which is perpendicular to the first polarization of light. Absorbing polarizer examples of the first polarizer 26 may be formed of a material configured to preferentially allow the transmission of the first polarization of light and preferentially absorb the second polarization of light. For example, the first polarizer 26 may be formed of a dichroic dye-based switchable system, a dye-based polarizer, an iodine-based polarizer and/or a wire grid polarizer.

According to various examples, the first polarizer 26 may be a reflective polarizer. For purposes of this disclosure, a reflective polarizer is a polarizer which transmits one polarization of light and reflects another polarization of light. According to various examples, the first polarizer 26 may be configured to transmit the first polarization of light and reflect the second polarization of light. The first polarizer 26 may have a total reflectance (e.g., the reflectance of all polarization the light) of from about 40% to about 60% and all values therebetween. For example, the first polarizer 26 may have a total reflectance of about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59% or about 60%. In reflective polarizer examples, the first polarizer 26 may be a linear polarizer, an elliptical polarizer or a circular polarizer, such as an achromatic circular polarizer, and might include an optical retarder such as a quarter-wave plate or a half-wave plate. Optionally, reflective polarizer examples may include a polymer-based film structure including at least one optically anisotropic layer. Such polymer-based film structure is generally referred to herein as an anisotropic polymer-based film (APBF). Non-limiting examples of APBFs are provided by a multilayered polymer film, including a body of alternating layers of a crystalline-based polymer and another selected polymer, or by micro-structured film-based polarizers, such as brightness enhancement films, or by dual brightness enhancement films.

The first polarizer 26 is positioned between the concealment layer 46 and the cover substrate 14. According to various examples, the concealment layer 46 extends around a perimeter of the electro-optic element 30 such that seals, edges or other non-aesthetically pleasing features may be concealed from a viewer of the cover substrate 14. Stated another way, the concealment layer 46 may be disposed proximate a periphery of the cover substrate 14. The concealment layer 46 may extend to an edge of the first polarizer 26 and/or to an edge of the cover substrate 14. The arrangement of the concealment layer 46 in the electronic device 10 creates the framed area 50. The framed area 50 of the concealment layer 46 may define one or more apertures, or areas which are free of the concealment layer 46 such that the viewing area 54 is defined and the electro-optic element 30 is visible. In this way, the viewing area may be in line with the electro-optic element 30. Contrary to conventional designs where masks may be applied to conceal edges of polarizing layers, the electronic device 10 of the present disclosure may utilize the first polarizer 26 between the concealment, or mask, layer 46 and the cover substrate 14 such that a viewer of the electronic device 10, through the cover substrate 14, views the electro-optic element 30 and the concealment layer 46 through the first polarizer 26.

The concealment layer 46 may be known as a spectral filter, mask layer and/or hiding layer. The concealment layer 46 may be composed of an ink, a metal, or other material which is translucent and/or opaque. According to various examples, the concealment layer 46 may include a black paint. Use of the concealment layer 46 may be advantageous in hiding edges of the electro-optic element 30 of the electronic device 10. For example, the concealment layer 46 may be disposed along the perimeter of electro-optic element 30 such that the edges of the electro-optic element 30 and other elements of the electronic device 10 may not be visible.

A gap 58 may be positioned between the first polarizer 26 and the third surface 32A of the electro-optic element 30. The gap 58 may be filled with an optical coupling agent, an adhesive, air, another filler material and/or combinations thereof. It will be understood that the gap 58 may be present by intent or may be present due to the thickness of the concealment layer 46.

The electro-optic element 30 may be an electrochromic element, a liquid-crystal element, other types of electro-optic elements 30 and/or combinations thereof. Furthermore, the electro-optic element 30 may define a third surface 32A and a fourth surface 32B. In some examples, the third surface 32A of the electro-optic element 30 is disposed proximate to the second surface 22 of the cover substrate 14. It will be understood that although a single electro-optic element 30 is referenced, multiple electro-optic elements may be utilized without departing from the teachings provided herein. Liquid-crystal element examples of the electro-optic element 30 may include a liquid-crystal material which includes nematic, smectic, columnar and/or cholesteric phases. According to various examples, the electro-optic element 30 may include one or more electrodes configured to apply an electrical potential, or field, across the liquid crystal material. In examples where the electro-optic element 30 includes the liquid crystal material, application of the electrical field may induce twisting and/or untwisting of liquid crystal molecules results in the rotating the polarization of the light from the light source 38.

In the depicted example, the second polarizer 42 is a separate standalone component within the electronic device 10, but it will be understood that the second polarizer 42 may be incorporated into the electro-optic element 30 and/or the light source 38 without departing from the teachings provided herein. According to various examples, the second polarizer 42 may be adhered, bonded or otherwise coupled to the light source 38 and/or the electro-optic element 30. The second polarizer 42 may be an absorptive and/or reflective polarizer as described with respect to the first polarizer 26.

The light source 38 may be positioned at a rear of the electronic device 10 and configured to emit light through the second polarizer 42 and into the electro-optic element 30. In some examples, the light source 38 is coupled to the fourth surface 32B of the electro-optic element 30. The light source 38 may include a light emitting diode (LED) light engine which may take a backlit and/or edge lit configuration. The light source 38 may be operable between an off state where no light is emitted into the second polarizer 42 and an on state where light is emitted into the second polarizer 42.

According to various examples, the electronic device 10 may include one or more optical filters. For example, the electronic device 10 may include a neutral density filter between the electro-optic element 30 and the cover substrate 14. For example, the neutral density filter may be positioned between the cover substrate 14 and the first polarizer 26. For purposes of this disclosure, a neutral density filter is an optical filter that reduces or modifies the intensity of all wavelengths, or colors, of light equally, giving no changes in hue of color rendition. It will be understood that other forms of optical filters may be utilized without departing form the teachings provided herein.

According to various examples, the electronic device 10 may include one or more diffusers 34. In the depicted example of FIG. 2B, the diffuser 34 is positioned between the third surface 32A of the electro-optic element 30 and the concealment layer 46, but it will be understood that the diffuser 34 may be positioned in a variety of locations. For example, the electronic device 10 may include a diffuser 34 between the first polarizer 26 and the cover substrate 14. The diffuser 34 may have a transmissivity to light greater than about 80% and more specifically between about 97% to about 98%. The diffuser 34 may have a thickness of about 115 microns, with about 100 microns of the thickness being a base film and about 15 microns being a diffuser film. The overall thickness of the diffuser 34 may vary up to about 15 microns. The base film may include a polyethylene terephthalate base layer and a back coating which functions as an anti-static surface. The diffuser 34 may have a haze of between about 80% and 90%. Haze is a measurement of wide angle scattering of the light as it passes through diffusion films. In some examples, the haze of the diffuser 34 is approximately 84% while in other embodiments it is about 89.5%.

Additionally or alternatively to the use of the diffuser 34, one or more surfaces of the electronic device 10 may be roughened in order to promote diffuse reflection of incident light. For example, the first and/or second surfaces 18, 22 of the cover substrate 14 may be roughened such that impinging light diffusely reflects from the first and/or second surface 18, 22. In a specific example, the first and/or second surfaces 18, 22 of the cover substrate 14 may be etched or otherwise roughened. Use of the roughened first or second surface 18, 22 may be advantageous in potentially eliminating the use of the diffuser 34 and saving manufacturing time and cost.

Referring now to FIGS. 1-2B, in operation, use of the first polarizer 26 which extends across the cover substrate 14 over both the concealment layer 46 and the electro-optic element 30 may aid in the reduction of the noticeability of the interface between the perimeter of the concealment layer 46 and the viewing area 54. For example, in the off state where the light source 38 is not emitting light, the viewing area 54 may appear black or dark grey. In examples where the concealment layer 46 is also black or dark grey in color, the human eye may be able to perceive the interface between the mask layer 46 and the viewing area 54. Further, differences in reflectance may aid in revealing such a discontinuity. Such a discontinuity is typically visible in conventional designs where polarizing layers are positioned below mask layers as the mask layer does not benefit from the optical properties of the polarizing layer. Use of the presently disclosed electronic device 10 with the first polarizer 26 positioned between the viewer of the electronic device 10 and the concealment layer 46 and electro-optic element 30 aids in both the reduction of reflection across the entirety of the cover substrate 14 (i.e., as opposed to only some locations in conventional designs) as well as the reduced apparentness of the interface between the viewing area 54 and the concealment layer 46 as the optical treatment (i.e., the first polarizer 26) has been applied equally across the cover substrate 14.

The electronic device 10 may exhibit an average total reflectance which is different in the framed area 50 than in the viewing area 54. As such, the electronic device may exhibit a first average total reflectance in the viewing area and a second average total reflectance in the framed area, which is different from the first average total reflectance. The average total reflectance across a wavelength range of about 400 nm to about 700 nm as measured in the framed area 50 of the electronic device 10 may be about 7.0%, or about 6.9%, or about 6.8%, or about 6.7%, or about 6.6%, or about 6.5%, or about 6.4%, or about 6.3%, or about 6.2%, or about 6.1%, or about 6.0%, or about 5.9%, or about 5.8%, or about 5.7%, or about 5.6%, or about 5.5%, or about 5.4%, or about 5.3%, or about 5.2%, or about 5.1%, or about 5.0%, or about 4.9%, or about 4.8%, or about 4.7%, or about 4.6%, or about 4.5%, or about 4.4%, or about 4.3%, or about 4.2%, or about 4.1%, or about 4.0% or any and all values and ranges therebetween.

The average total reflectance across a wavelength range of about 400 nm to about 700 nm as measured in the viewing area 54 of the electronic device 10 may be about 7.0%, or about 6.9%, or about 6.8%, or about 6.7%, or about 6.6%, or about 6.5%, or about 6.4%, or about 6.3%, or about 6.2%, or about 6.1%, or about 6.0%, or about 5.9%, or about 5.8%, or about 5.7%, or about 5.6%, or about 5.5%, or about 5.4%, or about 5.3%, or about 5.2%, or about 5.1%, or about 5.0%, or about 4.9%, or about 4.8%, or about 4.7%, or about 4.6%, or about 4.5%, or about 4.4%, or about 4.3%, or about 4.2%, or about 4.1%, or about 4.0% or any and all values and ranges therebetween.

A difference in average eye weighted reflectance ($\Delta E^*$) between the framed area 50 and the viewing area 54 is calculated by subtracting the average eye weighted reflectance ($E^*$) of the viewing area 54 from the average eye weighted reflectance of the framed area 50. An average $\Delta E^*$ across a wavelength range of about 400 nm to about 700 nm of the electronic device 10 may be about 2.0% or less, or about 1.9% or less, or about 1.8% or less, or about 1.7% or less, or about 1.6% or less, or about 1.5% or less, or about 1.4% or less, or about 1.3% or less, or about 1.2% or less, or about 1.1% or less, or about 1.0% or less, or about 0.9% or less, or about 0.8% or less, or about 0.7% or less, or about 0.6% or less, or about 0.5% or less, or about 0.4% or less, or about 0.3% or less, or about 0.2% or less, or about 0.1% or less, or about 0.01% or less or any and all values and ranges therebetween.

Furthermore, aesthetic characteristics, such as color and/or reflectance, should be relatively stable over different viewing angles to reduce of the noticeability of the interface between the perimeter of the concealment layer 46 and the viewing area 54. The color and/or reflectance may be stable in 2° field of view of a viewer (a 2° standard observer). In a CIE L*a*b color space, the lightness value, L*, represents the darkest black at L*=0, and the brightest white at L*=100. Color channels include a* and b*, which represent true neutral gray values at a*=0 and b*=0. The a* axis represents a green-red component, with green in the negative direction and red in the positive direction. The b* axis represents a blue-yellow component, with blue in the negative direction and yellow in the positive direction. A perceived difference in color may be measured by a ΔE*value. Delta E* may be defined as a measure of change in visual perception of two given colors. The relative perceptual differences between any two colors in L*a*b* may be approximated by the formula:

$$\Delta E^* = \sqrt{(L^*_0 - L^*_1)^2 + (a^*_0 - a^*_1)^2 + (b^*_0 - b^*_1)^2}$$

A ΔE* less than 1.0 may be not perceptible by human eyes, while a ΔE* of approximately 3 may be detectable at a glance by a casual observer. As such, the ΔE* between the interface between the perimeter of the concealment layer 46 and the viewing area 54, may be visibly matched such that the ΔE* value is less than about 15 units, or less than 10 units, or less than 7.5 units, or less than 5 units.

It will be understood that all E* and ΔE* values provided are as measured with an integrating sphere and a spectrometer in accordance with standard test procedures.

Examples

Provided below are examples of the present disclosure as well as comparative examples indicative of conventional designs and implementations.

Figure 3A:
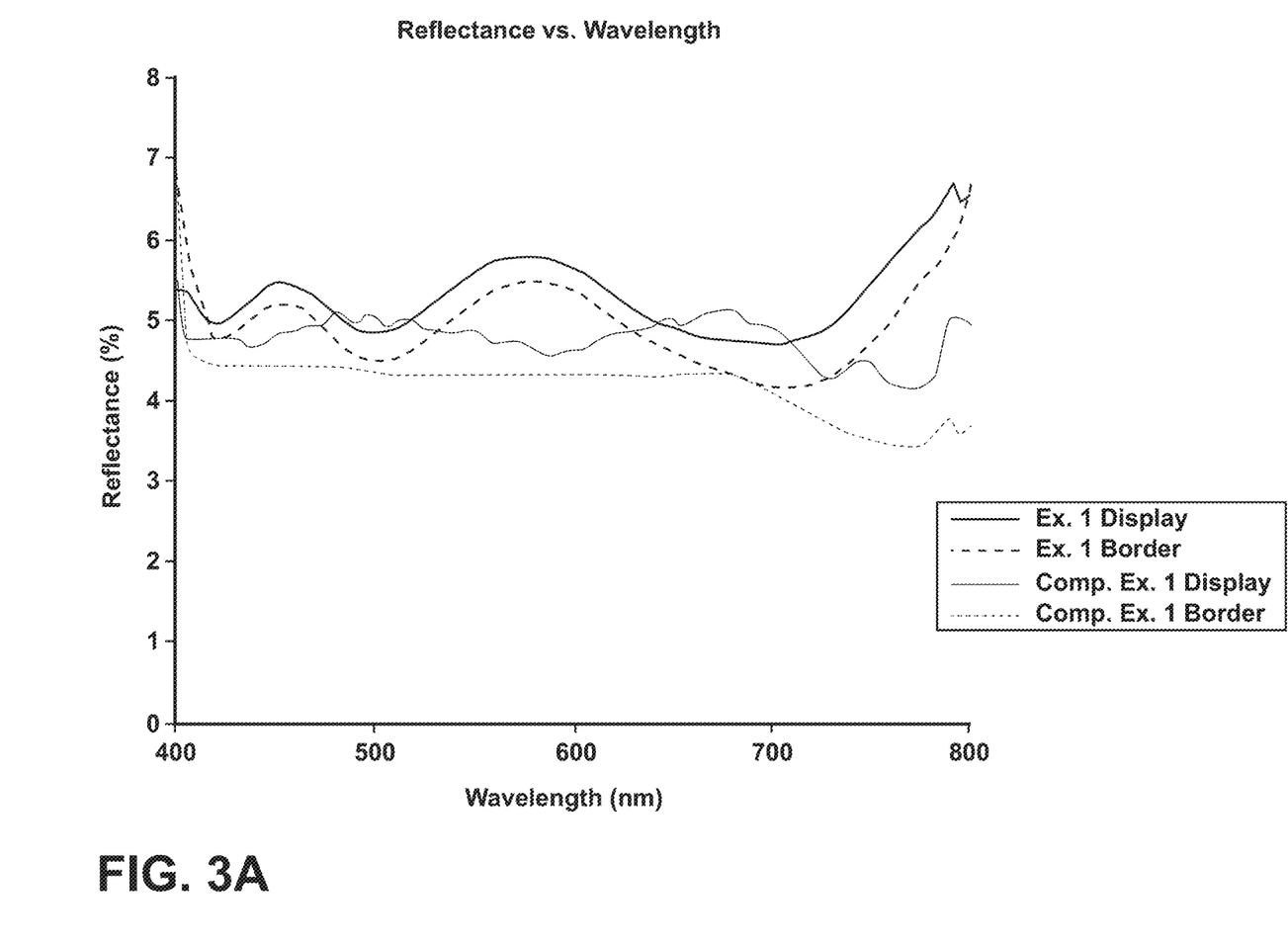
FIG. 3A is a plot of absolute reflectance vs. wavelength as measured at display and border regions for an example consistent with the present disclosure and a comparative example.
Figure 3B:
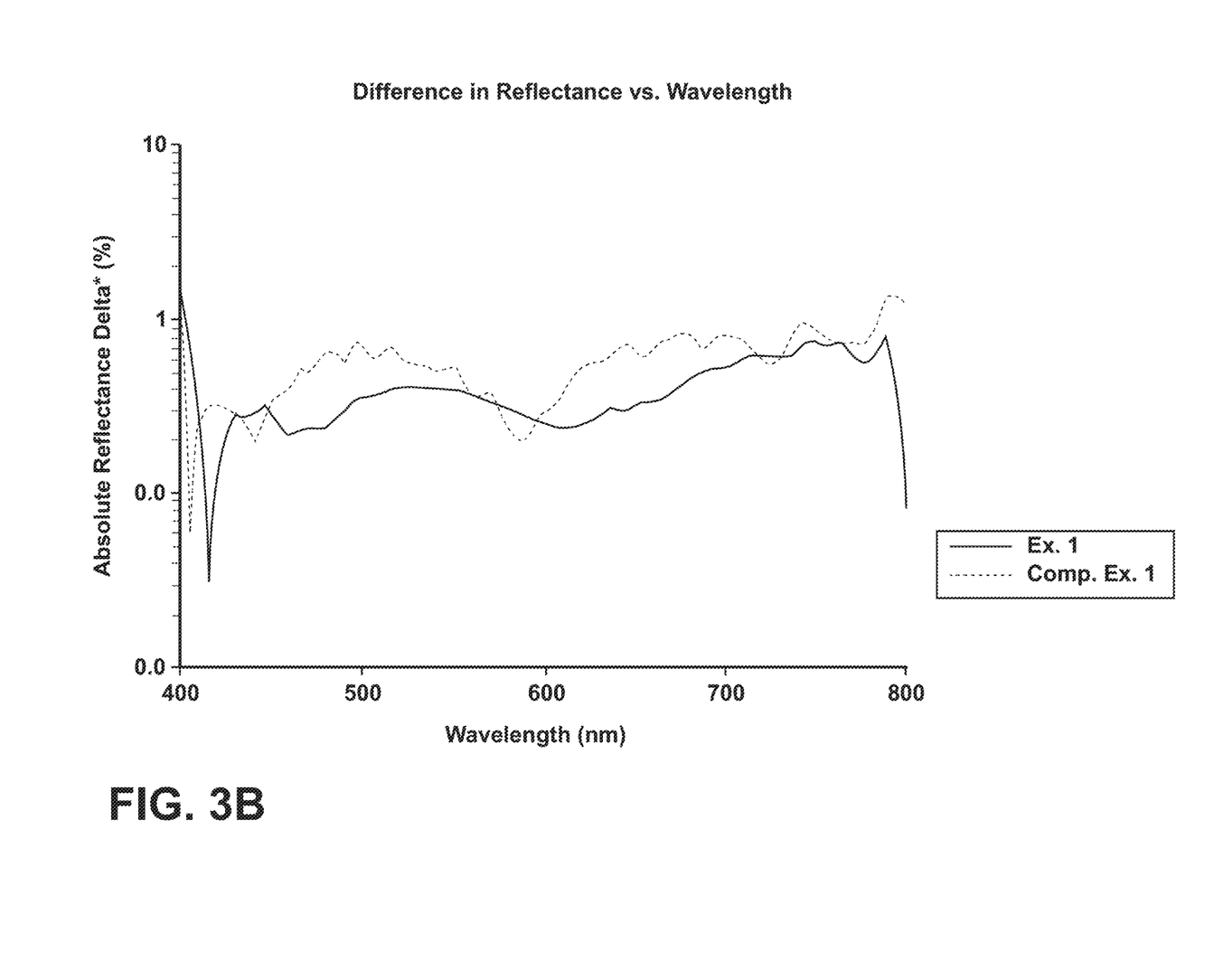
FIG. 3B is a plot of the difference in absolute reflectance vs. wavelength between the display and border regions of the example consistent with the present disclosure and the comparative example.

Referring now to FIGS. 3A and 3B, provided is optical data collected from a first example (Example 1) of a mobile device (e.g., the electronic device 10) and a comparative example. Example 1 is consistent with the present disclosure. Example 1 was a mobile device, including in order: a soda lime glass sheet (e.g., the cover substrate 14), a 20% transmission neutral density filter, a linear absorptive polarizer (e.g., the first polarizer 26), a black paint mask layer (e.g., the concealment layer 46) forming a border (e.g., the framed area 50) and defining a display (e.g., the viewing area 54), a liquid crystal display (e.g., the electro-optic element 30), a standard polarizer with brightness enhancing film (e.g., the second polarizer 42) and a backlight (e.g., the light source 38). The comparative example was an iPhone® 6S.

FIG. 3A is a plot of absolute reflectance vs. wavelength as measured at display and border regions for Example 1 and the comparative example, while FIG. 3B is a plot of the difference in absolute reflectance vs. wavelength between the display and border regions of Example 1 and the comparative example. As self-evident from the plots of FIGS. 3A and 3B, Example 1 exhibits a smaller average difference in total reflectance between the border and the display over a wavelength range of from about 400 nm to about 700 nm.

The difference in an average eye weighted reflectance (ΔE*) between the border and the display regions over a wavelength range of from about 400 nm to about 700 nm was calculated and is provided in Table 1. As can be seen, Example 1 exhibits a lower average eye weighted reflectance than the Comparative Example indicating that the reflectance difference between the border and display regions of Example 1 is less noticeable to a viewer than the Comparative Example.

TABLE 1

| Example | ΔE* |
| --- | --- |
| Example 1 | 0.76 |
| Comparative Example | 0.82 |

According to one aspect of the present disclosure, an electronic device includes a cover substrate defining a first surface and a second surface and an electro-optic element defining a third surface and fourth surface, wherein the third surface is adjacent the second surface. A polarizer is disposed between the second surface of the cover substrate and the third surface of the electro-optic element. A light source is coupled to the fourth surface of the electro-optic element. A concealment layer extends proximate a perimeter of the electro-optic element, wherein the concealment layer is positioned between the polarizer and the third surface of the electro-optic element.

According to another aspect of the present disclosure, the polarizer includes a circular polarizer.

According to another aspect of the present disclosure, the polarizer includes a linear polarizer.

According to another aspect of the present disclosure, the concealment layer is opaque to visible light.

According to another aspect of the present disclosure, the concealment layer includes an ink.

According to another aspect of the present disclosure, the electro-optic element includes a liquid crystal element.

According to another aspect of the present disclosure, a gap is positioned between the polarizer and the third surface of the electro-optic element.

According to another aspect of the present disclosure, the concealment layer defines a viewing area and a framed area and the electronic device exhibits a first average total reflectance in the viewing area and a second average total reflectance in the framed area, which is different from the first average total reflectance.

According to another aspect of the present disclosure, a diffuser is positioned between the electro-optic element and the concealment layer, wherein the diffuser includes a haze of between about 80% and 90%.

According to another aspect of the present disclosure, the first surface is roughened such that light diffusely reflects from the first surface.

According to another aspect of the present disclosure, a second polarizer is positioned between the light source and the fourth surface of the electro-optic element.

According to one aspect of the present disclosure, an electronic device includes a cover substrate defining a first surface and a second surface and a liquid crystal element defining a third surface and a fourth surface and disposed proximate to the second surface of the cover substrate. A first polarizer is disposed between the second surface of the cover substrate and the third surface of the liquid crystal element. A diffuser is positioned between the first polarizer and the third surface of the liquid crystal element. A concealment layer is positioned between the first polarizer and the diffuser and is proximate a periphery of the cover substrate. A second polarizer is coupled to the fourth surface of the liquid crystal element. A light source is coupled to the second polarizer.

According to another aspect of the present disclosure, the concealment layer extends around a perimeter of the liquid crystal element to define a framed area.

According to another aspect of the present disclosure, the framed area defines a viewing area in line with the liquid crystal element.

According to another aspect of the present disclosure, at least one of the first and second polarizers include an absorptive polarizer.

According to one aspect of the present disclosure, an electronic device includes a cover substrate defining a first surface and a second surface and an electro-optic element defining a third surface and fourth surface, wherein the third surface is proximate the second surface. A polarizer is coupled to the second surface of the cover substrate. A concealment layer is positioned between the polarizer and the third surface of the electro-optic element to define a viewing area and a framed area. The electronic device exhibits an average difference in eye-weighted reflectance between the framed area and the viewing area of about 0.8 or less over a wavelength range of form about 400 nm to about 700 nm.

According to another aspect of the present disclosure, the concealment layer extends around a perimeter of the electro-optic element.

According to another aspect of the present disclosure, the concealment layer substantially extends to an edge of the cover substrate.

According to another aspect of the present disclosure, the electro-optic element includes a liquid-crystal element.

According to another aspect of the present disclosure, the polarizer substantially extends to an edge of the cover substrate.

It will be understood by one having ordinary skill in the art that construction of the described disclosure and other components is not limited to any specific material. Other exemplary embodiments of the disclosure disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electronic device, comprising:
    a cover substrate defining a first surface and a second surface;
    an electro-optic element defining a third surface and fourth surface, wherein the third surface is adjacent the second surface;
    a polarizer disposed between the second surface of the cover substrate and the third surface of the electro-optic element;
    a light source coupled to the fourth surface of the electro-optic element;
    a concealment layer extending proximate a perimeter of the electro-optic element, wherein the concealment layer is positioned between the polarizer and the third surface of the electro-optic element; and
    a diffuser positioned between the electro-optic element and the concealment layer.

2. The electronic device of claim 1, wherein the polarizer comprises a circular polarizer.

3. The electronic device of claim 1, wherein the polarizer comprises a linear polarizer.

4. The electronic device of claim 1, wherein the concealment layer is opaque to visible light.

5. The electronic device of claim 1, wherein the concealment layer comprises an ink.

6. The electronic device of claim 1, wherein the electro-optic element comprises a liquid crystal element.

7. The electronic device of claim 1, further comprising:
    a gap positioned between the polarizer and the third surface of the electro-optic element.

8. The electronic device of claim 1, wherein the concealment layer defines a viewing area and a framed area and the electronic device exhibits a first average total reflectance in the viewing area and a second average total reflectance in the framed area, which is different from the first average total reflectance.

9. The electronic device of claim 1, wherein the diffuser comprises a haze of between about 80% and 90%.

10. The electronic device of claim 1, wherein the first surface is roughened such that light diffusely reflects from the first surface.

11. The electronic device of claim 1, further comprising: a second polarizer positioned between the light source and the fourth surface of the electro-optic element.

12. An electronic device, comprising:
a cover substrate defining a first surface and a second surface;
a liquid crystal element defining a third surface and a fourth surface and disposed proximate to the second surface of the cover substrate;
a first polarizer disposed between the second surface of the cover substrate and the third surface of the liquid crystal element;
a diffuser positioned between the first polarizer and the third surface of the liquid crystal element;
a concealment layer positioned between the first polarizer and the diffuser proximate a periphery of the cover substrate;
a second polarizer coupled to the fourth surface of the liquid crystal element; and
a light source coupled to the second polarizer.

13. The electronic device of claim 12, wherein at least one of the first and second polarizers comprise an absorptive polarizer.

14. The electronic device of claim 12, wherein the concealment layer extends around a perimeter of the liquid crystal element to define a framed area.

15. The electronic device of claim 14, wherein the framed area defines a viewing area in line with the liquid crystal element.

* * * * *